May 4, 1943.  P. JACQUIER  2,318,401
CANALIZATION
Filed Jan. 21, 1939
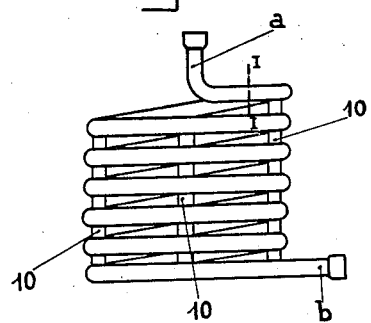
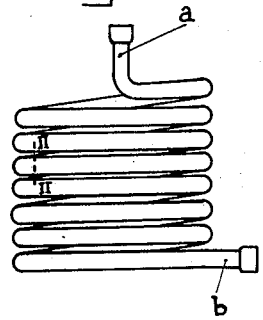
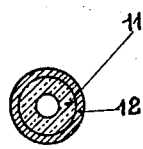
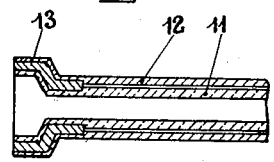
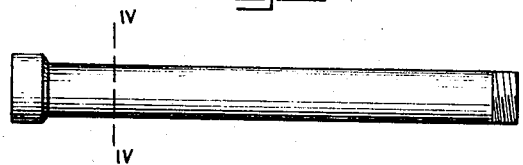
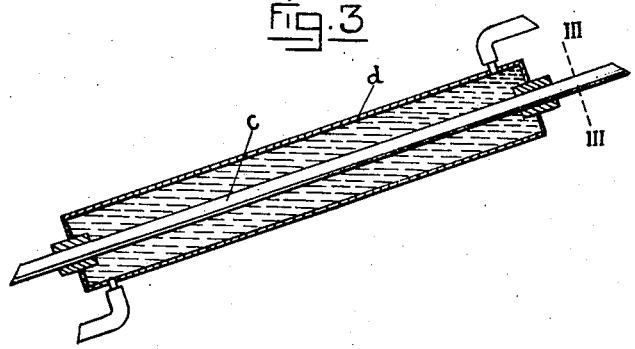
Inventor:
Pierre Jacquier
by
Edward H. Palmer
Atty.

Patented May 4, 1943

2,318,401

UNITED STATES PATENT OFFICE 2,318,401

CANALIZATION

Pierre Jacquier, Bazet, France; vested in the Alien Property Custodian

Application January 21, 1939, Serial No. 252,235
In Germany January 26, 1938

2 Claims. (Cl. 138—64)

This invention relates to canalizations or mains or conduits, more particularly though not necessarily for fluids or liquids, and one of the objects of the invention is to provide such a canalization of metallized material.

Canalizations for the interchange of heat of any shape but usually in the form of coils, are generally made of glass, or ceramics such as porcelain, stone ware or pottery, etc. or molded insulating material having rubber as a basis, that is to say of materials possessing low heat conductivity and the mechanical resistance or strength of which is inferior to that of metals.

It will be apparent, therefore, that for canalizations of such materials to have the necessary strength the walls of the pipes or conduits must be of adequate thickness and often, in the case of coils, supporting means, such as a frame or struts must be provided to support the convolutions throughout their entire length. As a result the heat interchanges between the liquids or fluids circulating within and without such canalizations are hindered or impeded by the excessive thickness of the walls of the latter as well as by said supporting means which increases the effective surface and consequently the weight of the apparatus and prolongs the time required for the operation.

In the case of conduits for conveying liquids or gases, the material used must be very strong, proof against corrosion and chemically inert as regards the liquid or gas conveyed.

Many materials have been proposed to meet these requirements. Metals have the required strength, but they sometimes injuriously affect the taste or odor of some liquids. Thus lead is frequently used for water conduits, also pottery, which however is quite fragile. In the case of thermal or mineral waters lead has the disadvantage that it may affect the taste or the composition of the water, wherefore it has been proposed to substitute porcelain or some other ceramic, but here again the fragile nature of these materials is objectionable.

The rules governing the materials to be used aboard ships are very strict, it being required that all drainage pipes shall be of unoxidable steel, particularly in war ships. This metal is also used for pipes in petroleum refineries. Canalizations made of this metal, however, are costly.

In the chemical industries glass is indicated and replaces metal in certain cases, in conduits for acids for example. But the glass used for this purpose demands great care in manufacture and constant supervision in use.

The present invention overcomes all these disadvantages and objectionable features, and it and its aims and objects will be readily understood from the following description of one illustrative embodiment thereof shown in the accompanying drawing in a few of the possible applications of said invention and which are given for illustrative purposes, the true scope of the invention being more particularly pointed out in the appended claims.

In the drawing:

Fig. 1 is a side elevation of a coil embodying one illustrative embodiment of the invention, with supporting means for the convolutions of the coil;

Fig. 2 is a side elevation like Fig. 1 but without said supporting means;

Fig. 3 is a longitudinal section of a rectilineal conduit embodying one illustrative embodiment of the invention, showing cooling means;

Fig. 4 is a side elevation of a section of a canalization or conduit embodying one illustrative embodiment of the invention;

Fig. 5 is a cross-section on lines I—I, II—II, III—III, IV—IV, of Figs. 1, 2, 3 and 4 respectively, and Fig. 6 is a longitudinal section of either end $a$ or $b$ of the coil in Figs. 1 or 2.

In Figs. 1 and 2 a coil embodying the invention is shown having ends $a$ and $b$, the convolutions of said coil in Fig. 1 being supported in suitable spaced relation by supporting means, such as struts or wedges 10 for example. Fig. 5 shows clearly the wall 11 of the canalization, conduit or coil, while 12 designates the metal covering or coating thereon. Fig. 6 shows a preferred construction of the ends of the coil, 11 being the conduit and 12 the metal covering. The end portion of said metal covering 12 will preferably be soldered upon a metal layer 13 applied to the outer surface of the end portion of said conduit 11. Said metal layer 13 may be applied to the outer surface of said conduit in any suitable manner, for example by spraying. The remaining portion of the metal covering 12 may be set upon said conduit. In Fig. 3 the invention is shown as it may be used for condensing vapors. A conduit or tube $c$ constructed in accordance with the present invention, and through which the vapor to be condensed is caused to pass, is provided with suitable cooling means, such as a cooling chamber $d$ to which cold water or other cooling liquid is supplied at its lower end and escapes therefrom at its upper end.

The conduit proper 11 may be made of any suitable material but said material will preferably possess a strength or mechanical resistance inferior to that possessed by metals, and when said conduit is used for the interchange of heat it will preferably be of heat conductive material, the coefficient of heat conductivity of which may be less than that of metals.

The application of the metal covering to the outer surface of the conduit proper, that is to say, the metalizing of said conduit may be effected in any suitable manner, for example by spraying, electrolytic deposit, metal enamel, plating or setting of a tubular metal sheath or casing, etc. According to the mode of covering used, the metal layer or deposit may be in intimate contact with the material to be covered and preferably binding the latter without adhering or being soldered thereto but so as effectively to protect said material. When the use is for heat interchange said metal covering will thus take upon itself and facilitate such interchange under the most favorable conditions, while being able to expand without separating itself from said material, the heat producing only a relaxation of the binding action, that is to say diminishing the permanent compression of said material. Or said metal deposit or covering may be actually connected or soldered to the material of the conduit at certain spaced points. In such case the exterior metal covering and the material covered thereby will preferably have the same coefficient of expansion. Thus, in the case of refrigerating or cooling apparatus, the metal covering of the conduit or tube, in order to prevent leakage may be soldered to the material of said tube at its two extremities only. To facilitate such soldering a metal deposit may first be made upon the outer surface of the material of the tube by spraying or metal enameling or in any other suitable manner. The metal covering or sheathing being thus soldered at both ends to the material of the tube all around its circumference, infiltration of the cooling liquid between said material and said metal covering by the cooling liquid circulating exteriorly of said tube is excluded.

The invention possesses many important advantages. Thus in the case of a refrigerating or cooling tube, a porcelain cooling coil for example, the wall thickness of the latter may be materially reduced. The strength or mechanical resistance of the coil being increased by the metal covering, the frame for supporting the convolutions of the coil may be replaced by wedges which support said convolutions only at spaced points of their length (see Fig. 1) or they may be completely omitted when the porcelain wall of the coil and the metal covering or layer applied thereto are of suitable thickness (see Fig. 2).

The thickness to be given the wall of the coil and the metal covering or layer applied thereto, in order to obtain the required strength or mechanical resistance can be readily determined in advance by calculation and tests without difficulty by anyone skilled in the art.

As already pointed out the good conductivity of the metal covering or sheath furthers a uniform distribution of temperature upon the outer surface of conduits used for heat interchanges and also improves such interchanges. As a result the developed surface of the canalization or conduit can be materially reduced, so that in general in spite of the metal covering used the weight and cost of the whole structure will be materially less than the weight and cost of similar apparatus heretofore used.

The metal used for the covering will preferably be such as will not be attacked by the medium in which it is to be used or said covering should be covered in turn by such an unattackable metal.

Porcelain conduits and those made of other ceramics when metallized in accordance with the present invention have the strength required for practical use. This is a great advantage in the case of conduits to be used for the conveyance or distillation of liquids as neither the taste nor the chemical composition of the liquid will be affected. The thickness of the metal layer should be sufficient to give the necessary strength to the conduit and it as well as the nature of said covering will vary according to the use to which the conduit is to be put. In any case the metal layer deposited upon the porcelain or other material forming the conduit in accordance with the present invention being much thinner than the walls of the all metallic conduits or tubes heretofore in general use, conduits and tubes embodying the present invention are materially lighter and cost less to transport than those heretofore used.

In accordance with the present invention the conduits or tubes may easily be provided exteriorly with a layer of material adapted to protect them from attack by the medium in which they are to be used or against electrolytic corrosion.

Whatever the use to which canalizations, conduits or tubes embodying the present invention may be put, whether, for example, the heat interchanges between fluids or liquids or their conveyance or distillation, the connecting up or joining up of different elements or sections forming the canalization can be made by placing metal upon metal, so that no special precautions are necessary to avoid breakage of the porcelain or other fragile material used. The metal deposit used in accordance with the present invention lends itself perfectly to soldering and the making of screwed couplings or other couplings or joints, all of which can be made sufficiently impervious to fluids and liquids.

I am aware that the present invention may be embodied in other specific forms without departing from the spirit or essential attributes thereof, and I therefore desire that the present embodiment of the invention be considered in all respects as illustrative and not restrictive, reference being had to the appended claims rather than to the foregoing description to indicate the scope of the invention.

I claim:

1. A conduit made of material possessing less mechanical resistance than metals; metal inserts fixed to the end portions of said conduit; and a non-adherent, thin metal coating upon the outer surface of said conduit in intimate contact with the material thereof and soldered to said inserts.

2. A conduit made of material possessing less mechanical resistance than metals; metal inserts fixed to the end portions of said conduit; and a non-adherent, thin metal coating deposited upon the outer surface of said conduit, in intimate, binding contact with the material thereof, by any suitable, conventional metallizing process, said coating being soldered to said metal inserts.

PIERRE JACQUIER.